(12) United States Patent
Flanagan

(10) Patent No.: US 8,452,498 B2
(45) Date of Patent: May 28, 2013

(54) SHIFTING SYSTEM WITH TACTILE FEEDBACK

(75) Inventor: William T. Flanagan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 12/059,910

(22) Filed: Mar. 31, 2008

(65) Prior Publication Data
US 2009/0248260 A1 Oct. 1, 2009

(51) Int. Cl.
G06F 7/00 (2006.01)
G06F 17/00 (2006.01)
G06F 19/00 (2011.01)

(52) U.S. Cl.
USPC .............. 701/52; 701/51; 434/71; 74/473.18; 74/473.21; 200/61.88

(58) Field of Classification Search
USPC .... 701/51, 52, 56; 434/29, 62, 71; 74/473.12, 74/473.18, 473.21, 473.22, 473.23, 473.36, 74/900; 200/61.28, 61.85, 61.88
See application file for complete search history.

(56) References Cited

U.S. PATENT DOCUMENTS

| 5,068,583 | A * | 11/1991 | Gresham et al. | 318/266 |
| 6,295,886 | B1 * | 10/2001 | Russell | 74/473.18 |
| 6,422,941 | B1 * | 7/2002 | Thorner et al. | 463/30 |
| 6,474,186 | B1 * | 11/2002 | Vollmar | 74/335 |
| 6,636,197 | B1 * | 10/2003 | Goldenberg et al. | 345/156 |
| 7,104,152 | B2 * | 9/2006 | Levin et al. | 74/471 XY |
| 7,200,477 | B2 * | 4/2007 | Burzio | 701/52 |
| 7,639,239 | B2 * | 12/2009 | Kajimoto et al. | 345/173 |
| 2005/0202932 | A1 * | 9/2005 | Burzio | 477/97 |
| 2008/0070197 | A1 * | 3/2008 | Yu | 434/62 |
| 2011/0076651 | A1 * | 3/2011 | Best et al. | 434/71 |

FOREIGN PATENT DOCUMENTS

| CN | 1646833 A | 7/2005 |
| CN | 2833259 Y | 11/2006 |

OTHER PUBLICATIONS

Chinese Patent Office, Chinese Office Action dated Mar. 1, 2012 for Chinese Patent Application No. 200910132518.X.

* cited by examiner

*Primary Examiner* — Thomas Tarcza
*Assistant Examiner* — Rami Khatib
(74) *Attorney, Agent, or Firm* — Ingrassia Fisher & Lorenz, P.C.

(57) ABSTRACT

Methods and apparatus are provided for a tactile feedback system. The system comprises a transmission indicator having a position, the position adapted to be adjusted by a user, a feedback device coupled to the transmission indicator, the feedback device adapted to produce a vibration in response to a feedback signal, and a control system adapted to detect the position of the transmission indicator and to transmit a feedback signal to the feedback device.

14 Claims, 2 Drawing Sheets

SHIFTING SYSTEM WITH TACTILE FEEDBACK

TECHNICAL FIELD

The subject matter described herein generally relates to transmission shifting, and more particularly relates to feedback systems of transmission shifters.

BACKGROUND

Some vehicles use electronic or electrically-assisted transmission shifters to request a shift in the transmission from one operable state to another operable state. Typically, such a request is first transmitted to a control system which monitors requests as well as the state of the transmission and/or other vehicle operating states. In certain circumstances, it is not possible or desirable to act upon a request initiated by the vehicle operator through the transmission shifter. In one example, it may not be possible to shift the vehicle into "park" while the vehicle is in motion. While the control system can determine that a requested change, such as that in the non-limiting example, is not possible, it is preferable to additionally convey to the vehicle's operator that the requested transmission change has not taken place.

Accordingly, a feedback mechanism of some type can be implemented to provide an indication to the operator that the control system has not implemented the change of transmission operable states as requested. A desirable feature of such a feedback mechanism includes the characteristic of high probability of successful notification of the operator.

BRIEF SUMMARY

An apparatus is provided for a shifting system for use in vehicles. The apparatus comprises a transmission indicator having a position, the position adapted to be adjusted by a user, a feedback device coupled to the transmission indicator, the feedback device adapted to produce a vibration in response to a feedback signal, and a control system adapted to detect the position of the transmission indicator and to transmit a feedback signal to the feedback device.

A method is provided for responding to transmission shift requests. The method comprises receiving a first signal conveying a request to change to a desired transmission state from a shifter, determining whether the request to change is an invalid request, sending a second signal to the shifter when the first signal conveys an invalid request, and operating a tactile feedback device coupled to the shifter in response to the second signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

At least one embodiment will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the application or uses thereof. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a control system, transmission system, or a component thereof may employ various integrated circuit components, e.g., memory elements, digital signal processing elements, logic elements, look-up tables, or the like, mechanical and electro-mechanical devices and components and the like, which may carry out a variety of functions under the control of one or more microprocessors, mechanical switches, or other control devices. In addition, those skilled in the art will appreciate that embodiments may be practiced in conjunction with any number of data transmission protocols and that the system described herein is merely one suitable example.

Furthermore, the connecting lines shown in the various figures contained herein are intended to represent example functional relationships and/or physical couplings between the various elements. It should be noted that many alternative or additional functional relationships or physical connections may be present in an embodiment of the subject matter.

"Connected/Coupled"—The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one example arrangement of elements, additional intervening elements, devices, features, or components may be present in an embodiment of the depicted subject matter.

Figure 1:
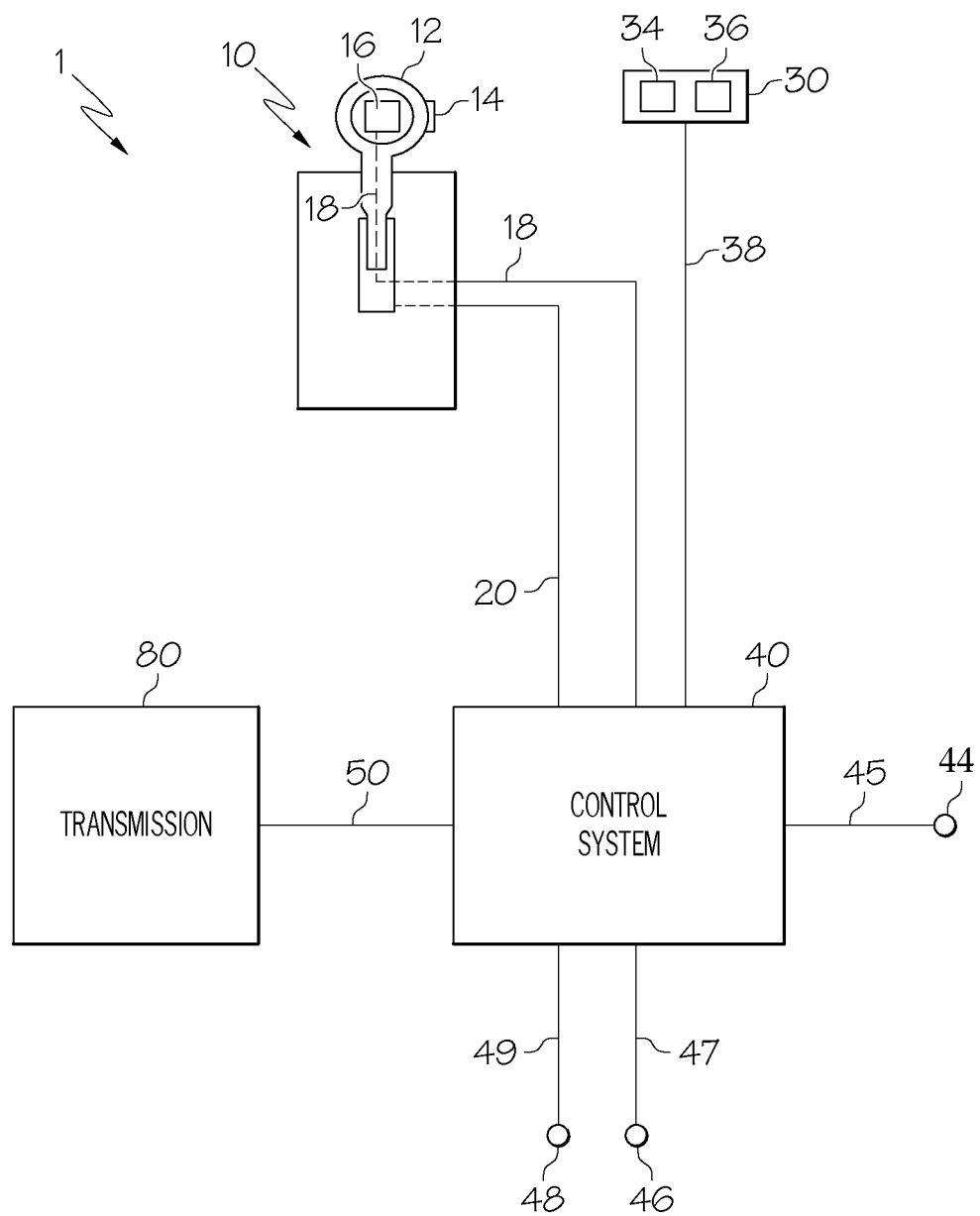
FIG. 1 illustrates an embodiment of a transmission shifting system.

FIG. 1 illustrates one embodiment of a shifting system 1. The shifting system 1 can be present in any suitable type of vehicle, including, but not limited to, automobiles, watercraft, and motorcycles. Such a vehicle can have an electronically-controlled or electrically-assisted transmission shifting mechanism. The illustrated embodiment comprises a vehicle shifting assembly 10, a control system 40, and a transmission 80. The vehicle shifting assembly 10 can be coupled to the control system 40. The vehicle shifting assembly 10 can comprise a shifting arm 12. The shifting arm 12 can be coupled to the control system 40. The control system 40 can be coupled to the transmission 80 of the vehicle. The transmission 80 can have several operational states which can be adjusted to operate the vehicle.

The shifting arm 12 can be disposed in a plurality of positions, each position corresponding to at least one mode of operation of the vehicle or operational state of the transmission 80. The shifting arm 12 can optionally include a shifting button 14 which, in some embodiments, can necessitate depression prior to positioning the shifting arm 12 in one or more positions. Manipulation of the shifting arm 12 can optionally include the use of a clutch of the vehicle, the practice of which is well-known in the art. A change in the operable state of the transmission 80 can be made in response to manipulation of the shifting arm 12.

In some embodiments, the shifting arm 12 can occupy a single position. Such a shifting arm can be manipulated to adjust the operable states of the vehicle by toggling the shifting arm 12 in a direction, whereupon a signal is generated to the control system 40 and the shifting arm 12 returns to its original position. Other methods of manipulating the shifting arm 12 are also contemplated in different embodiments, including manipulation of devices, such as buttons, knobs, or levers on a stationary shifting arm 12.

The shifting arm 12 can be coupled to the control system 40 by means of a shifting wire 20. Other connection mechanisms, such as cabling, wireless communication, mechanical, or hydraulic line, can also be used.

The shifting arm 12 can comprise a tactile or haptic feedback device or system, such as a vibrator 16. In some embodiments, the feedback system can comprise other components, including, without limitation, a processor element, memory element, information storage or communication element, or control device. In certain embodiments, the tactile feedback device can include or be realized as other items, including without limitation a shaker, an oscillating mechanism, a rotating device, a pulsing device, or an electrostatic device.

The vibrator 16 is preferably coupled to the shifting arm 12 such that when the vibrator 16 is activated, vibrations are produced that are detectable by a human extremity in contact with the shifting arm 12. Accordingly, the vibration strength and/or regular vibrating duration of vibrator 16 can vary. Similarly, the vibrating duration of the vibrator 16 can be altered to produce various vibrating patterns, including, but not limited to, single short pulses, single long pulses, repeated short or long pulses, alternating short and/or long pulses of vibration, or others, any and all with varying intensity. Other feedback devices can have similar varying patterns of operation. In some embodiments, different patterns of operation, by vibration or other means, can be indicative of different responses from the control system 40.

The vibrator 16 can be coupled to the control system 40 by a first feedback wire 18. The vibrator 16 can be operated directly by the control system 40 or, in some embodiments, can transmit a signal to the tactile feedback device, which can independently operate a vibrator or other mechanism.

The control system 40 can be coupled to the shifting assembly 10 through the wires 18, 20. The control system 40 can also be coupled to the vehicle's transmission 80 through a transmission interface 50. The transmission interface 50 can be of any type suited to the vehicle, transmission, and control system. In some embodiments, the transmission interface 50 can be a wire, hydraulic line, mechanical or electro-mechanical device, electronic component, although other means are contemplated. Among other functions, the transmission interface 50 can, in some embodiments, provide information or a signal to the control system 40 indicating the current operational state of the transmission 80.

The control system 40 can be implemented or performed with one or more processing components, such as a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

In those embodiments of the control system 40 which comprise memory components, such memory components can be realized as RAM memory, flash memory, EPROM memory, EEPROM memory, registers, a hard disk, a removable disk, a CD-ROM, or any other form of storage medium known in the art. The memory components can be coupled to one or more processing components such that the processing components can read information from, and write information to, the memory components. In some embodiments, memory components can be integral to one or more processing components. As an example, in some embodiments, processing components and memory components can reside in an ASIC or FPGA.

The control system 40 can also be coupled to a second feedback device 30 by a second feedback wire 38. The second feedback device 30 can comprise a visual feedback device 34 and/or an audible feedback device 36. Either or both of the feedback devices 34, 36 can be independently operable similar to the tactile feedback device 16, in varying durations, alternating sequences, or combinations thereof. Similarly, while one embodiment of the visual feedback device 34 is a light emitting diode or other lighting device emitting radiation within the human visual range, another can be a visual feedback assembly comprising a processor element, memory element, and other components adapted to operate a visual element. The audible feedback device 36 can also comprise either an audible noise generator, such as a piezoelectric buzzer or speaker, or a component assembly adapted to create an audible noise, among other embodiments. Accordingly, the control system 40 can operate the visual or audible feedback devices 34, 36 directly, or transmit signals to them, allowing for independent operation.

The control system 40 can be coupled with various other components and sensors in the vehicle. By way of example, in the embodiment illustrated in FIG. 1, a vehicle speed sensor 44 is coupled to the control system 40 by a speed sensor wire 45. The vehicle speed sensor 44 can be adapted to detect the speed of the vehicle and transmit information containing the vehicle's current speed or a signal indicative thereof to the control system 40 through the speed sensor wire 45. As described above with regard to the first and second feedback wires 18, 38, shifting wire 20, and transmission interface 50, the speed sensor wire 45 can cooperate or be replaced by other linking mechanisms as well. Similarly, other exemplary sensors can include an accelerator sensor 46 and a brake pedal sensor 48 coupled to the control system by an accelerator sensor wire 47 and a brake pedal sensor wire 49, respectively.

Vehicles, such as one possessing the shifting system 1, typically employ more than one transmissive gear for use during operation of the vehicle, the use and arrangement of which, including forward and reverse gearing, are well-known in the art. Some vehicles can have a reverse gear and up to six forward gears. Certain vehicles can have a manual transmission shifter, whereby the operator of the vehicle can manipulate the transmission to adjust or change it between different operable states, each state using a different transmissive gear. In such vehicles, known as having manual transmissions, the shifting can be accomplished through mechanical linking or electro-mechanical manipulation of components. Typically, a shifting lever, knob, handle, or stick is provided for manipulation by the operator.

Some vehicles can have electrical or electrically-assisted shifting. Some vehicles can have drive-by-wire components as well. With such transmission systems, the operator can select among modes of operation of the vehicle (e.g. "park," "reverse," "neutral," "drive") or among specific operable states of the transmission 80 (e.g. "reverse," "first," "second," "third") or both. In some vehicles, a shifting arm 12 can be used to select among a combination of operable modes of the vehicle as well as specific operational states of the transmission 80 (e.g. "park," "reverse," "neutral," "drive," "fourth gear," "third gear"). The shifting arm 12 can physically indicate a state by its position or it can adjust an indicator which corresponds to the state of the transmission. Typically, vehicles which employ electrical or electrically-assisted shifting can comprise a control system 40 which receives signals from the shifting arm 12 indicating a change in position of the shifting arm 12. The control system 40 can determine the current state of the transmission 80 and, combined with other criteria, evaluate whether a shift request signal is a valid request or an invalid request.

A valid shift request can be one which requests a change in operable state of the transmission 80 from the current state to one which results in acceptable, permissible, desirable, and/or allowable operation of the vehicle and/or transmission 80. As non-limiting examples, valid shift requests can be those which indicate a change in operable state of the transmission 80 from park to neutral, neutral to reverse, neutral to the first forward gear at low speeds, the first forward gear to the second forward gear at suitable speeds, and the like.

An invalid request can be one which requests a change in operable state of the transmission 80 from the current state to one which results in unacceptable, impermissible, undesirable, and/or unallowable operation of the vehicle and/or transmission 80. Some non-limiting examples can include those which indicate a change in operable state of the transmission 80 from the fifth forward gear to the first forward gear at high speeds, from the fifth forward gear to the reverse gear at high speeds, from neutral to the first forward gear at high speeds, from neutral to the fifth forward gear at low speeds, and the like. Low and high speeds which determine the validity of shifting requests can vary from vehicle to vehicle and the control system 40 of a vehicle can maintain acceptable ranges of speeds based on specific requests. Other transmission shift requests can be valid or invalid requests as well. The full spectrum of criteria by which transmission shift requests are determined or selected to be valid or invalid can be stored in the control system 40 or a component thereof.

In the event a signal indicating an invalid request is provided to the control system 40 by an occupant of the vehicle through manipulation of the shifting arm 12, it is preferable for the control system 40 to not perform the requested change in operable states of the transmission 80. Additionally, it is preferable to indicate to the occupant that the requested change was not performed.

During operation, an operator or other occupant of the vehicle can indicate a requested change in operational mode of the vehicle or operational state of the transmission 80 by changing the position of the shifting arm 12. In some vehicles, such as those where a shifting arm 12 is not mechanically coupled directly to a transmission, the repositioning of the shifting arm 12 can result in a signal being sent to the control system 40 by the shifting assembly 10.

Upon receiving a requested change of mode of operation of the vehicle, and in response thereto, the control system 40 can perform one of several operations. In some embodiments the control system 40 can compare the requested operational state of the transmission 80 with the current operational state of the transmission 80. In some embodiments, the control system 40 can additionally compare indicia from various sensors, such as the speed sensor 44, accelerator pedal sensor 46, brake pedal sensor 48, among other sources.

The control system 40 can determine whether a request for change in operational mode of the vehicle or operational state of the transmission is valid or invalid by comparing input from the various sources and signals. In the instance where a valid request is determined, the control system 40 can adjust the operational state of the transmission 80. Additionally, the control system 40 can activate, or emit a signal to, any or all of the tactile, visual, or audible feedback devices 16, 34, 36. The activation or signal can accomplish any of the modes of activation described above.

Figure 2:
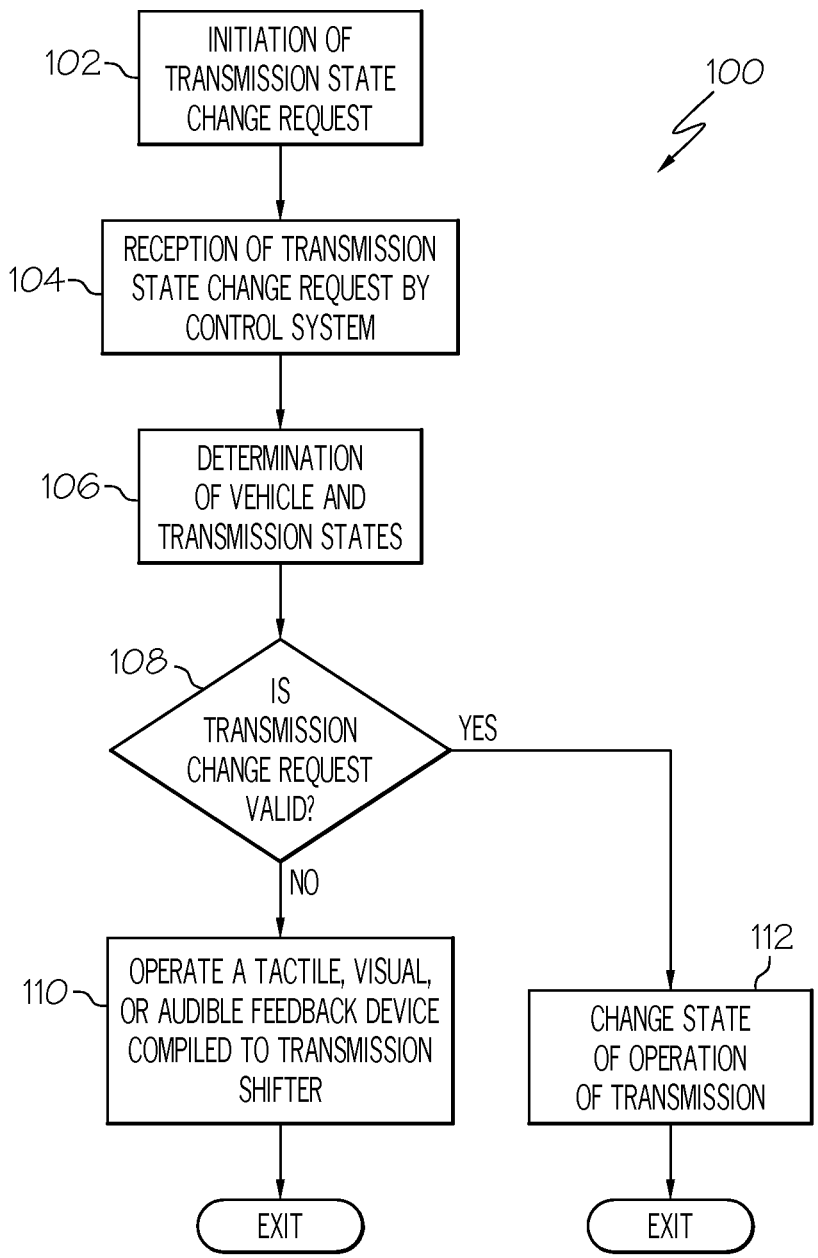
FIG. 2 is a flow chart that illustrates an embodiment of a method of operating a transmission shifting system.

FIG. 2 is a flow chart that illustrates a sequence 100 of steps by which a user requests a change of operable state of the transmission, a control system determines validity of the request, and the control system initiates one or more responsive actions. In one embodiment, the user can initiate 102 a request for a change in operable state of the transmission of a vehicle. In some embodiments, the change in operable state can also result in a change of mode of operation of the vehicle. As a part of the initiation 102 of the request, a signal can be sent to a control system, which can receive 104 the signal indicative of a request of a change in the operable state of the transmission. The control system can determine 106 the current operable state of the transmission, as well as various characteristics about the vehicle, including, but not limited to, speed, acceleration, and degree of engagement of the brakes. Upon determining 106 the state of the transmission and various characteristics of the vehicle, the control system can select 108 whether the request is valid or invalid.

To determine whether a request is valid or invalid, the control system can obtain as input various characteristics of the vehicle, such as the current state of the transmission, speed, acceleration, and degree of engagement of the brakes, among others. The control system can have programmed logic operations stored in at least one component. Accordingly, once the various inputs, including the requested operable state of the transmission, have been collected, the control system can perform one or more operations. Such operations can include retrieving tables and matching states. In one embodiment, one such table can be a plurality of inputs mapped to a list of permissible and impermissible operable states of the transmission. The control system can then compare the state of operation of the transmission requested to the sets of acceptable, permissible, desirable, and/or allowable and unacceptable, impermissible, undesirable, and/or unallowable operable states. Where such a request would result in an unacceptable, impermissible, undesirable, and/or unallowable operable state of the transmission, the request is invalid. Where such a request would result in an acceptable, permissible, desirable, and/or allowable operable state of the transmission, the request is valid.

In the case where a request is invalid, the control system can be adapted to operate 110, or cause to be operated, a tactile feedback device coupled to the shifting arm. The tactile feedback device can be any of the types described above, or another, and can be operated in any desired suitable manner. Additionally, visual and/or audible feedback devices can be operated simultaneously, or nearly simultaneously, to provide additional avenues of feedback. The control system can be adapted to not implement the requested change in instances of invalid transmission change requests. By operating a tactile feedback mechanism, the user of the system can be informed of the outcome of the requested shift operation. While visual and/or audible feedback can also be provided, it is possible for the user's attention to be diverted from the sources of feedback, such as by visually inspecting the surrounding environment, or by competing audible sounds. The necessity of physical contact between the user and the shifting arm to request a transmission state change, however, offers a high probability that tactile feedback provided to the shifting arm will be immediately recognized by the user. Accordingly, the tactile feedback device is preferably coupled to the shifting arm.

In the case where a request is valid, the control system can change 112 the transmission to the requested state. In some embodiments, the control system can optionally operate, or cause to be operated, any of the tactile, visual, or audible feedback devices. Preferably, such operation or caused operation can be in a different pattern or sequence than those resulting from invalid transmission change requests.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A shifting feedback system for use in vehicles, the system comprising:
    a transmission operable in a plurality of states;
    a shifting arm adapted to select one of the states of the transmission thereby initiating a transmission change, the shifting arm configured to transmit a request signal to a control system when selecting one of the states of the transmission; and
    a feedback device coupled to the shifting arm and to the control system, the feedback device configured to emit a tactile feedback signal in response to the request signal, the tactile feedback signal detectable by physical contact with the shifting arm, the control system controlling the feedback device to generate vibration pulses in the shifting arm in a first pattern if the requested transmission change has taken place and a second pattern if the requested transmission change has not taken place.

2. The shifting feedback system of claim 1, wherein the shifting arm comprises an electronic shifter.

3. The shifting feedback system of claim 1, wherein the feedback device further comprises an audible feedback device, the audible feedback device adapted to emit an audible signal in response to the request signal.

4. The shifting feedback system of claim 1, wherein the feedback device further comprises a visual feedback device, the visual feedback device adapted to emit a visual signal in response to the request signal.

5. The shifting feedback system of claim 4, wherein the feedback device further comprises an audible feedback device, the audible feedback device adapted to emit an audible signal in response to the request signal.

6. A method of responding to transmission shift requests for a vehicle having a shifter and a tactile feedback device coupled to the shifter, the method comprising:
    receiving, at a control system of the vehicle, a first signal conveying a request to change to a desired transmission state, the first signal originating from the shifter;
    determining, with the control system, whether the request to change is an invalid request;
    sending a second signal from the control system to the shifter when the desired transmission state change is an invalid request and sending a third signal from the control system to the shifter when the desired transmission state change is an valid request; and
    using the control system to operate the tactile feedback device in response to one of the second and third signal, wherein the control system controls the feedback device to generate vibration pulses in different patterns that are indicative of the valid or invalid request.

7. The method of claim 6, wherein the step of determining whether the request to change the state of the transmission is an invalid request further comprises comparing the state of the transmission and the desired transmission state.

8. The method of claim 7, wherein the step of determining whether the request to change state of the transmission is an invalid request further comprises comparing the state of the transmission with at least one of the current speed of the vehicle, the current state of a set of brakes of the vehicle, and the current state of an accelerator pedal of the vehicle.

9. The method of claim 6, further comprising generating at least one of an audible or visual signal in response to the second signal.

10. The method of claim 6, further comprising changing the state of the transmission to the desired transmission state after receiving a valid request.

11. A tactile feedback system for a vehicle having a transmission operable in a plurality of states, the tactile feedback system comprising:
    a transmission indicator having a position, the position configured to be adjusted by a user;
    a feedback device coupled to the transmission indicator, the feedback device configured to produce one of a first and a second vibration in response to a feedback signal; and
    a control system coupled to the feedback device and configured to detect the position of the transmission indicator and configured to transmit the feedback signal to the feedback device,
    wherein the control system alters the operable state of the transmission when the position of the transmission indicator is adjusted to indicate a valid transmission change request and does not alter the operable state of the transmission when the position of the transmission indicator is adjusted to indicate an invalid transmission change request, and
    wherein further the first vibration is indicative of an invalid transmission change request not having taken place and the second vibration is indicative of a valid request having taken place.

12. The tactile feedback system of claim 11, wherein the transmission indicator comprises an electronic shifting arm.

13. The tactile feedback system of claim 11, wherein the control system is adapted to detect the speed of the vehicle.

14. The tactile feedback system of claim 11, wherein the control system is further adapted to alter the operable state of the transmission when the position of the transmission indicator is adjusted to indicate a valid request.

* * * * *